(No Model.)
W. J. SILVER.
HYDRAULIC MOTOR.
No. 251,302. Patented Dec. 20, 1881.
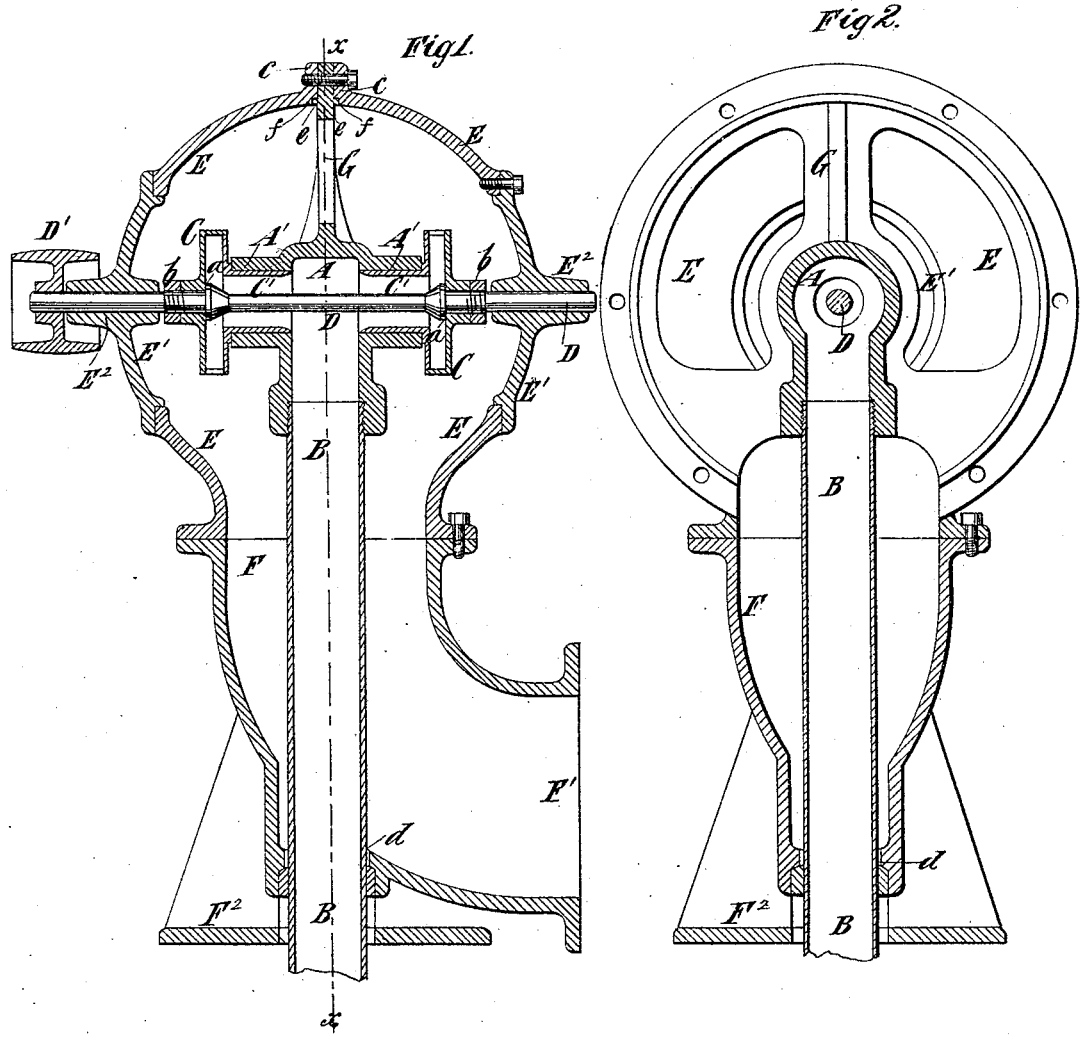
WITNESSES
INVENTOR

UNITED STATES PATENT OFFICE.

WILLIAM J. SILVER, OF SALT LAKE CITY, UTAH TERRITORY.

HYDRAULIC MOTOR.

SPECIFICATION forming part of Letters Patent No. 251,302, dated December 20, 1881.

Application filed August 4, 1881. (No model.)

*To all whom it may concern:*

Be it known that I, WILLIAM J. SILVER, of Salt Lake City, in the county of Salt Lake and Territory of Utah, have invented certain new and useful Improvements in Hydraulic Motors or Turbines, of which the following is a specification.

The principal objects of my invention are to provide a turbine or hydraulic motor in which the pressure due to the head of water can only act on the smaller parts of the machine, and not upon the outer case, as in turbines now made; also, to provide suitable bearings for the shaft out of reach of dirt and grit, which are so destructive to the bearings of ordinary turbines, and also provide for the ready removal of the working parts from the case for the removal of any obstruction, or for any other purpose.

To these ends my invention consists in the combination, in a turbine, of a distributer or body, of comparatively small size, with which the inlet-pipe communicates, one or two turbine wheels fitting openings in said distributer or body and receiving water therefrom, a shaft having fixed upon it said wheel or wheels, and an outer shell or case which contains bearings for said shaft, and into and from which the water is discharged from the turbine wheel or wheels, all as more specifically hereinafter described.

The invention also consists in various details of construction, hereinafter described, whereby facility is afforded for the ready removal and replacing of the smaller internal working parts of the wheel, which alone receive any considerable amount of pressure from the water employed to drive the wheel.

In the accompanying drawings, Figure 1 represents a central vertical section of a turbine embodying my invention; and Fig. 2 represents a similar section in a plane at right angles to Fig. 1, as indicated by the dotted line *x x*, Fig. 1.

Similar letters of reference designate corresponding parts in both the figures.

A designates the central body of the turbine, which has openings A' in opposite sides, so that it constitutes a distributer of the water, which is received through the inlet-pipe B. The inlet-pipe in this example of my invention is vertical, and extends upward into the body A; but it might be otherwise arranged.

C designates two turbine wheels, which are arranged in the openings A' in the distributer A, and may be of any approved construction. In case the amount of water available is limited, one wheel only may be employed and a blank wheel placed in the opposite opening, A', thereby balancing the pressure lengthwise of the shaft and obviating all end-thrust thereof. Each wheel is constructed with a cylindric throat, C', which fits in the opening A' in the body and distributer A, and I thus provide ample bearings for the wheels.

D designates a shaft, (here shown as horizontal and having a pulley, D',) from which power may be transmitted by a belt; but the power might be transmitted by gearing, if more desirable. Each wheel C is secured to the shaft D between a shoulder, *a*, and a nut, *b*, screwed upon the shaft, and either wheel can be readily removed and replaced by another, if necessary.

The outer case of the turbine is composed principally of two hemispherical shells, E, which are provided with flanges *c*, through which bolts are inserted for securing them together. These two shells form a case, which is approximately globular in form, which is bolted to a downward extension or continuation, F, made in the form of an elbow, and having an outlet, F', to which the discharge-pipe is to be attached. The said extension or continuation has at its lower end a bearing or socket, *d*, in which the inlet-pipe B fits, and it is constructed with a bracket or foot, F², which may be bolted to any suitable support, and by which the turbine is supported.

Instead of being made in the form of an elbow, the part F might consist simply of a short cylindric portion and the water be discharged directly downward, where it is necessary to reduce the height of the turbine.

The central body and distributer, A, has cast upon it a diaphragm, G, of the form shown clearly in Fig. 2, which is clamped securely between the flanges C upon the parts E of the case, as seen clearly in Fig. 1, and the body and distributer is thereby held securely in proper position within the case. In order to aid in properly centering the body and distributer A, I make the diaphragm G with an annular projection, *e*, upon each side, which fits in a rabbet or annular recess, *f*, in the two parts E of the case, as clearly seen in Fig. 1, and the diaphragm is of skeleton form, with large openings, as seen in Fig. 2, to provide for the free passage of water. Upon opposite sides of the case are openings, through which the shaft D passes, and which are large enough to enable the wheels C to be removed through them without disturbing the remaining parts. Each opening is closed by a cap, bonnet, or cover, E', in which is formed a bearing, E², for the shaft D, and the said bearings may be as long as is necessary to give the required bearing-surface. As soon as the water escapes from the wheels C it, of course, looses its pressure, and it will therefore be seen that the case is not subjected to any considerable pressure, and may therefore be made very much lighter than the cases of turbines which are exposed to the full pressure of the water. The outer case is so large that the water at no time fills it, and hence there is no liability of grit being carried into the bearings F² and cutting them.

It will also be seen that the manner of constructing the outer case enables the working parts to be quickly removed and replaced, in case any obstruction gets into the wheel, or for repairing the parts which are subject to wear, and this may be done without the necessity of drawing off the head of water or emptying the penstock.

What I claim as my invention, and desire to secure by Letters Patent, is—

1. In a turbine or hydraulic motor, the combination of an inner body and water-distributer having an opening or openings, a shaft extending through the same, a wheel or wheels fixed upon said shaft and fitting said opening or openings and receiving water therefrom, and an outer case which receives the discharge-water and comprises bearings for said shaft, substantially as specified.

2. In a turbine or hydraulic motor, the combination, with the inner body and distributer, the shaft, and the wheels, of the inlet-pipe extending to said body and distributer, and the outer case comprising bearings for said shaft and having an outlet at the bottom, substantially as specified.

3. In a turbine or hydraulic motor, the combination of the body and distributer A, the wheels C, the shaft D, the diaphragm extending from said body and distributer, and the divided case E, between the two parts of which the said diaphragm is clamped, substantially as specified.

4. In a turbine or hydraulic motor, the combination of the body and distributer A, the wheels C, the shaft D, the case E, and the bonnets or covers E', comprising bearings E², substantially as specified.

WM. J. SILVER.

Witnesses:
CHARLES SMITH,
ZEBULON JACOBS.